March 13, 1956   J. E. JENDRISAK   2,737,758
GLASS BENDING MOLD

Original Filed Oct. 12, 1950   3 Sheets-Sheet 1

Inventor
Joseph E. Jendrisak
By Nobbe & Swope
Attorneys

March 13, 1956  J. E. JENDRISAK  2,737,758
GLASS BENDING MOLD
Original Filed Oct. 12, 1950  3 Sheets-Sheet 2
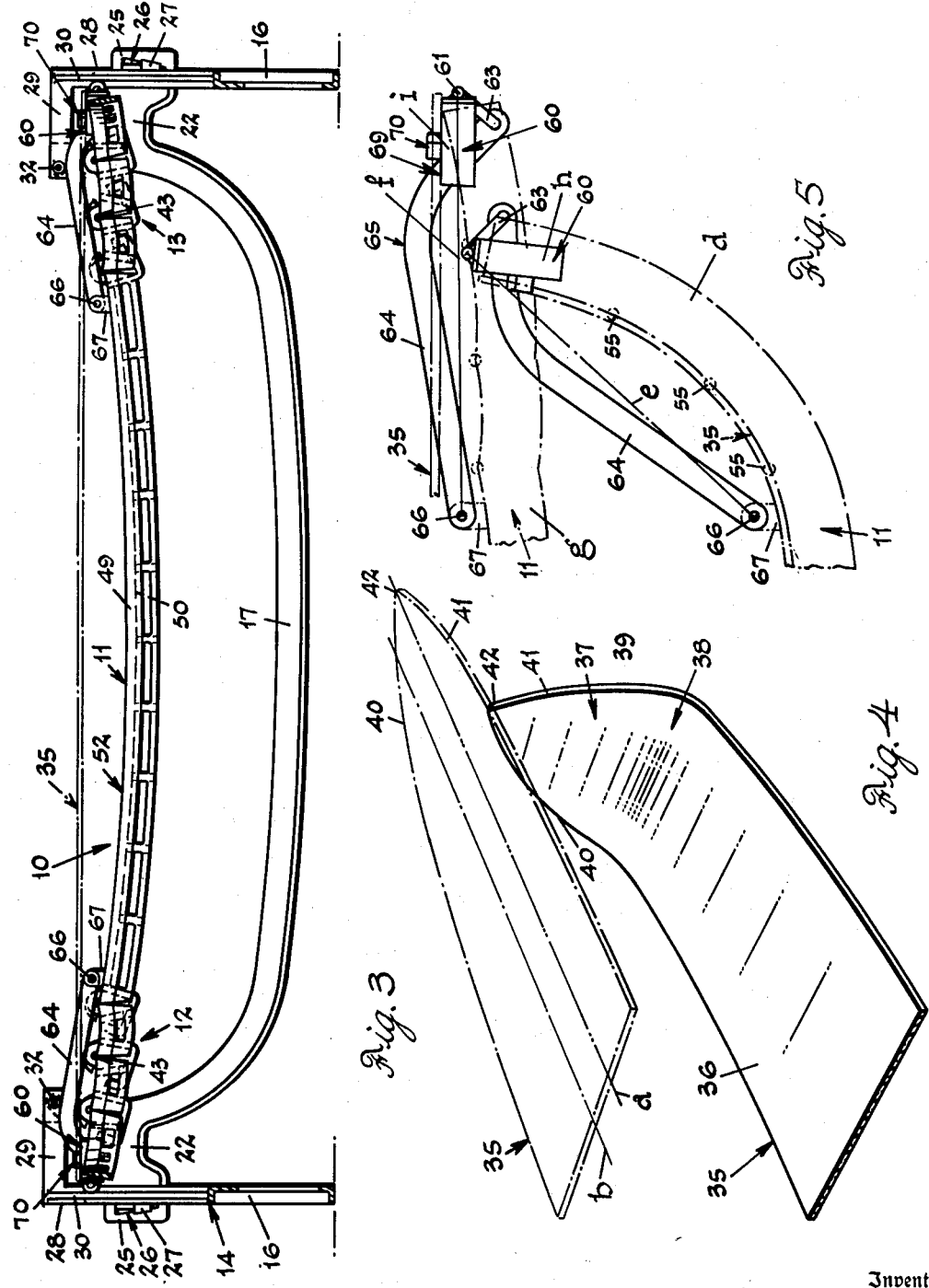
Inventor
Joseph E. Jendrisak
By Nobbe & Swope
Attorneys

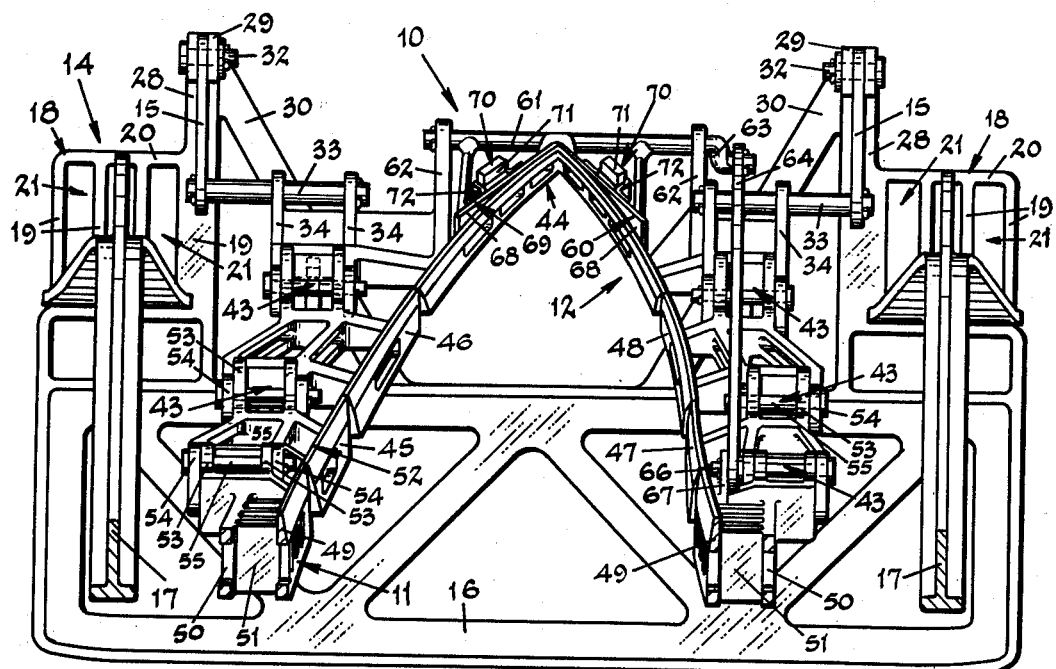

United States Patent Office 2,737,758
Patented Mar. 13, 1956

2,737,758

GLASS BENDING MOLD

Joseph E. Jendrisak, Northville, Mich., assignor to Libbey-Owens-Ford Glass Company, Toledo, Ohio, a corporation of Ohio Continuation of abandoned application Serial No. 189,805, October 12, 1950. This application November 10, 1953, Serial No. 391,273

11 Claims. (Cl. 49—67)

The present invention relates broadly to the shaping of glass sheets or plates to a predetermined curvature, and particularly to a improved bending mold and means for supporting a glass sheet on the same.

This application is a continuation of my co-pending application Serial No. 189,805, filed October 12, 1950, now abandoned.

Heretofore, it has been the usual practice to produce bent glass sheets on molds of the ring or outline type by locating the same at definite points at each end of the mold. In most instances these glass sheets, when flat, and even when finally bent, have retained some resemblance to a rectangular pattern, and molds upon which they were bent might easily be provided with suitable locators to insure that the entire perimeter of the sheet would be properly received on exact areas of the mold shaping surface.

However, in response to the demand for automotive streamlined design in which there is incorporated increasingly large areas of visual opening at the front or rear of the vehicle, the glass sheets for either the front windshield or rear window must be provided in a size and shape that will include, in addition to the generally accepted size of these open areas, a portion of the corners and even areas of the sides of the vehicle which heretofore have been considered a part of the solid or metal enclosing structure. As a result, the form of glass sheet required to serve as the closure must, of necessity, be pattern cut in exacting outline and further bent to a curvature which can be checked within closely established tolerances.

Moreover, in many instances, a glass sheet that has been cut for this purpose will have an outline shape in the flat that is not adaptable to ordinary methods of locating or supporting the same in balanced condition preparatory to the bending operation. This condition is attributable to a peculiarity in the outline of the required shape of sheet and which results in an elongated body portion terminating in wedge-shaped end areas which are not in alignment with the longitudinal axis of the sheet.

Briefly stated, this invention is concerned with an improved type of outline bending mold of hinged construction and provided with means adapted to locate and support an unbent sheet while the same is physically in an unstable or out-of-balance condition such as has just been described. By means of a novel mold construction, as herein provided, the glass sheet is locatable in end areas of the mold and portions of these areas are employed to sustain or support the sheet in balance and in proper registration with the shaping surfaces of the mold until the marginal areas of the sheet are received thereon.

It is an aim of the invention to provide an improved bending mold of hinged construction which will support a flat sheet in balanced relation to the shaping surfaces thereof and subsequently carry it into the final bent shape while continuing to support the ends of the sheet in proper registration to said shaping surfaces until it substantially reaches the end of its bending movement.

Another object of the invention is to provide a bending mold of the above character wherein a normally unbalanced condition of a glass sheet is compensated for and the ends thereof are supported in moving relation to major portions of the mold until the sheet is centrally received on the mold shaping surfaces and the ends may be directed into registration with the respective areas of the said surfaces.

Another object of the invention is to provide a bending mold of the above character wherein locating and supporting elements for the ends of a flat glass sheet are operatively connected to adjoining sections of the hinged construction and caused to support the said sheet at each end until substantial completion of the bending movement.

A further object of the invention is to provide a hinged bending mold of the above character which will support a glass sheet in the flat with the shaping surface thereof in close proximity to said sheet, and subsequently carry it into its final bent form, while simultaneously closing in a manner to present a continuous shaping surface to the glass sheet as it reaches the end of its bending movement.

A still further object of the invention is to provide an improved bending mold, and a supporting frame therefor, which will exert a large amount of force upon a sheet of glass to be bent thereby urging the properly heated sheet into its bent form, while supporting the ends of said sheet to maintain the same in perfect balance and registration until substantial completion of the bending movement.

Other objects and advantages of the invention will become more apparent during the course of the following description when taken in connection with the accompanying drawings.

In the drawings, wherein like numerals are employed to designate like parts throughout the same:

Fig. 3 is a sectional view, similar to Fig. 2, with the mold in open or glass receiving position;

Fig. 4 is a perspective view showing in full lines one half section of a glass sheet that has been bent on the mold of the invention, and in phantom lines the same section of the sheet in the flat prior to bending;

Fig. 5 is a diagrammatic view of one end of the mold and the cooperating members for locating and supporting the ends of the glass sheet;

Fig. 6 is an enlarged vertical, transverse sectional view taken through the mold on line 6—6 of Fig. 1;

Fig. 7 is an enlarged, longitudinal sectional view taken through one end of the mold on line 7—7 of Fig. 1; and Fig. 8 is a fragmentary, cross sectional detail view of three hinged sections of the mold.

Figure 1:
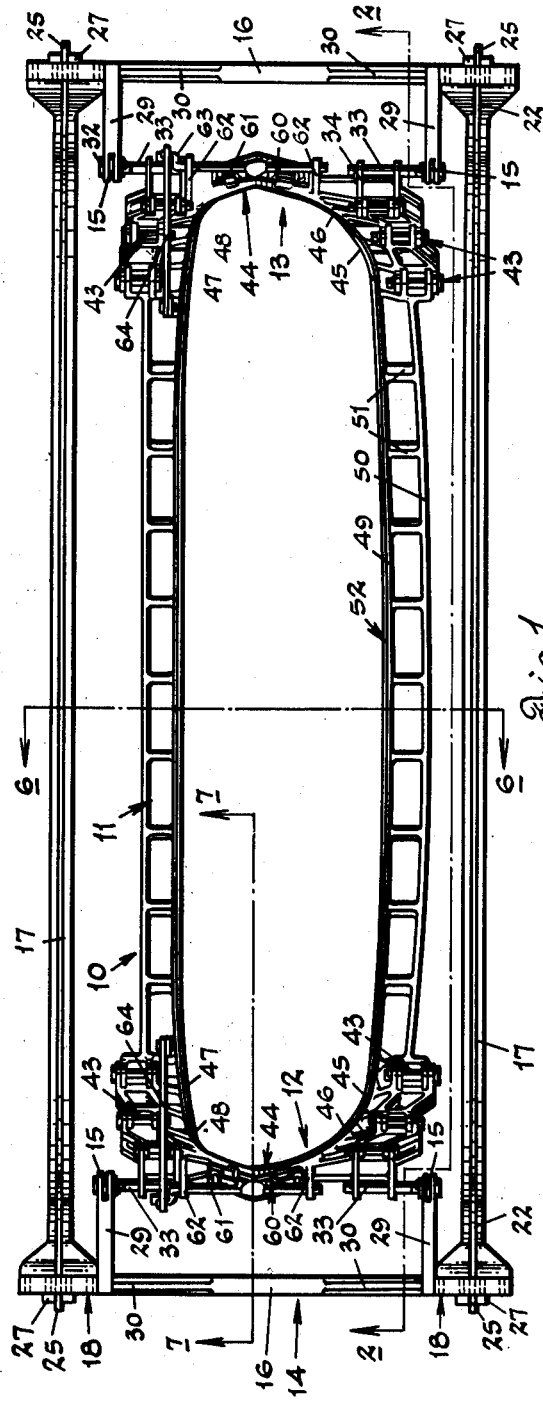
Fig. 1 is a plan view of a bending mold and supporting frame as constructed in accordance with the invention.

With reference now to the drawings, and particularly to Fig. 1, there is disclosed a bending mold constructed in accordance with this invention, and designated in its entirely by the numeral 10. The mold comprises a multiplicity of hingedly connected, cast sections consisting essentially of a pair of spaced, parallel, central sections 11, and a pair of end sections 12 and 13 connecting the adjacent ends of the central sections to form a complete outline or skeleton mold.

The end sections 12 and 13, as will be hereinafter described in detail, are each formed of a series of hingedly articulated members that are pivotally related to one another in the same manner that each of the end sections 12 and 13 per se are pivotally related to the central sections 11 of the mold 10. Thus, the end sections 12 and 13 are movable with respect to the central sections 11 from the closed position of the mold to the open, glass receiving position thereof, and they are also adapted to open and close radially as the component members of each end section are swung with respect to one another. The provision of a bending mold of this particular construction makes it possible to orient various areas of a generally curved contour from a complex bend curvature into a series of interjoining areas having a substantially straight line relationship which will more closely approximate the over-all length of the flat glass sheet.

Figure 2:
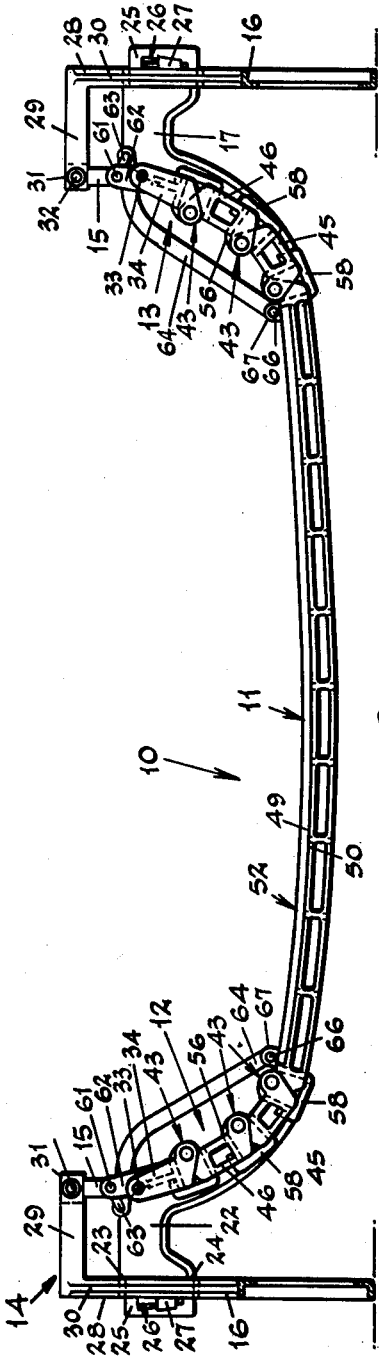
Fig. 2 is a vertical, longitudinal section through the mold and frame taken on line 2—2 of Fig. 1 with the mold in its closed position.

In elevation (as best seen in Fig. 2) the connected sections of the mold resemble a U-shape of which the web has a relatively shallow concave contour with the ends rising at a particularly sharp angle therefrom. In plan view (Fig. 1) the end sections 12 and 13 form a wedge shape with the top or apex thereof located off-center, so that in relation to the normal longitudinal axis of the mold, a line through the apices of the wedge shape formed by the end sections is along a line or plane which is parallel to, but does not coincide with, a normal axis.

The mold 10 is bodily carried within a supporting framework 14 by means of links 15 arranged in the corners thereof and pivotally connected to the end sections 12 and 13 in such a manner as to permit the end sections to swing with reference to the framework and in hinged association with the central mold section 11. The framework 14 comprises end frames 16 and side rails 17 which substantially parallel the central mold sections 11 and are curved to the general curvature of the mold 10 in its entirety.

The end frames 16 are generally rectangular in outline and have rising slotted sections 18 at the opposite upper corners thereof. These slotted sections 18 are composed of a series of four vertically disposed bars 19 which are joined at their upper ends by a horizontally disposed web 20 to form three vertically elongated slots 21 through which the ends of the side rails 17 may be inserted. Referring to Figs. 6 and 7, it will be noted that the ends 22 of the side rails 17 are provided with special machined shoulder portions 23 and 24, that abut one side of the slotted sections 18, and a tongue 25 which is located in one of the slots 21. The tongues 25 are located in directly opposed slots of the end frames 16 that are selected according to the spacing required between the side rails 17 to accommodate the mold 10. Apertures 26 are formed in each of the tongues 25 and are preferably triangular in outline to receive wedges 27 and firmly position the shoulders 23 and 24 against the slotted sections 18 and generally effect a rigid construction throughout the framework 14.

The innermost bar 19 of each section 18 is extended upwardly above the horizontal upper web 20 as a pillar 28 and a horizontally disposed arm 29 is directed inwardly therefrom, the arm 29 being reenforced by a suitable brace 30. The ends 31 of the arms are slotted to receive the upper ends of the links 15 which are supported therein by pins 32 carried in the bifurcated ends 31 of the arm 29. The lower end of each link 15 is formed to provide a journal for a shaft 33, the opposite end of which is similarly journaled in uprights 34 formed integrally with the end sections 12 and 13 of the mold as shown in Fig. 6. The mold 10 is thus pivotally suspended within the framework 14 and the sections thereof are freely movable in their hinged association to move from their closed positions to a more expanded or open position by swinging movement of the links 15.

As an example of the bent forms or curvatures that may be produced in accordance with the present invention, one half of a bent glass sheet is illustrated in Fig. 4 wherein the sheet generally designated 35 is shown as having a relatively elongated central span 36 of large radius and end areas 37 which rise sharply from the central span 36 through areas 38 of substantially small radius and terminate in surfaces 39 of increased radius. It will be noted that this type of bend broadly resembles a U-shape of exceedingly wide central web and noticeably shortened legs and more specifically a combination of curved surfaces wherein the end surfaces 39 might be regarded as actually folded inwardly with respect to the central area or span 36.

This particular pattern also includes in the end areas 37 a patterned or outline contour embodying a wedge shape having a curved edge 40 convergently disposed with respect to the opposed curved edge 41 which is of a greater curvature. Consequently, as shown in phantom lines, the outline of the glass sheet 35, in the flat, is of an elongated pattern having wedge-shaped ends and, by reason of the curvature of the edge 40 relative to the curvature of the edge 41, a line $a$ drawn through the apices 42, will not coincide with the normal longitudinal axis of balance or gravity, indicated by the letter $b$.

The mold 10, upon which, according to this invention, a typical bend of the above-described character may be produced, is constructed, as previously explained, of the central sections 11 and end sections 12 and 13. The central mold sections 11 thus embody the shaping surface for the corresponding central span of the glass sheet when bent while the end areas rising from the said central span are received on and shaped by the end sections 12 and 13. In conformance with these end areas, each of the end mold sections is generally wedge shaped in plan and in elevation is curved upwardly to conform to the desired contour for the end areas of the sheet.

The several sections of the mold 10 are pivotally interconnected by means of a plurality of hinges generally indicated at 43, and provision is made to orient each of the respective mold sections when in the open or glass receiving position in such a manner that their adjoining edges maintain substantially as close a relationship as when the mold sections are in their closed positions with respect to each other. This is accomplished by so arranging the hinging means by which the several sections are interconnected that the continuity of the mold shaping surface is retained in either the open or closed positions, and consequently less movement is required to bring about the desired mold operations.

In other words, the curved ends of the mold are divided into sections of such length that the over-all surface of the mold when in the open position may closely approach a straight line and the actual radial distance through which the end sections of the mold travel will be materially shortened.

Referring more particularly to the end mold sections 12 and 13, it will be noted in Figs. 6 and 7, and has been explained above, that each of these sections comprises a series of especially cast parts which terminate in a V-shaped crotch member 44. The cast parts between the ends of the central mold sections 11 and the end crotch members 44 include transversely aligned pairs of members 45 and 46 on one side of the sections 12 and 13 and similarly related members 47 and 48 on the other side of the said mold sections. The members 45 to 48 inclusive are hingedly interconnected to one another as well as to the central mold sections 11 by means of the hinges 43 and each of these associated elements of the mold has a generally similar body construction and is provided with spaced ears which, in overlapping relation, cooperate to form said hinges.

This generally similar construction of the related sections 11 and the members 44 to 48 inclusive of the end sections 12 and 13 of the mold includes an inner rail 49, an outer rail 50 and transversely disposed webs 51 that are interposed between the inner and outer rails to adequately reenforce the mold throughout its open or ring outline. The inner rail 49 of each of the sections constitutes a part of the mold's contour and the actual shaping surface 52 is finished on the upper edges thereof.

The hinges 43 are created, at the adjoining ends of the central sections 11 and of the parts 44 to 48, inclusive, of the end sections 12 and 13, by pairs of spaced ears 53 at one end of said sectional parts and spaced ears 54 at their opposite ends. Preferably, the ears 54 are spaced apart sufficiently to receive the ears 53 in overlapping relation therebetween and when thus assembled may be provided with journal openings for the hinge pins 55. As will be noted, the ears 53 and 54 may be formed as continuations of the outer rails 50. Also, the major body portion of each of said ears is generally above the line of the outer rails 50 to position the axis of the hinge pins 55 in substantially horizontal alignment with the shaping surface 52 on the inner rails 49.

The rails 49 of the cast parts 44 to 48 inclusive are formed to continue the shaping surface 52 and maintain the gradually upward and inwardly directed curved portions of said surface in its end areas. It will also be noted that the end mold sections 12, associated with one end of the central sections 11, and the end mold section 13, associated with the opposite end of the mold sections 11, are inversely curved with respect to each other to obtain the desired symmetry of mold outline.

By arranging the axes of the respective hinges 43 in the manner described above, a novel method of opening the mold is achieved since the pivotally associated sections thereof may be elevated into approximately a straight line (see Fig. 3), the extreme points of the mold in the end members 44 obtaining a spaced distance substantially equal to the over-all length of the flat glass sheet as determined by the distance between the apices 42 as described in connection with the pattern cut sheet illustrated by phantom line in Fig. 4. The shaping surface 52 of the mold thus actually more closely approaches the surface of the glass sheet when flat and the amount of free downward movement required of the glass in sagging into registering contact along the shaping surface is thereby substantially reduced.

The inner spaced ears 53 of the hinges 43 also are formed to function as stops 56 and thereby prevent reverse pivotal movement of the mold sections. This is a factor of safety afforded for the mold to assure a positive downward limit of movement when the mold and the glass sheet supported thereon reach the end of the bending movement. Each of the ears 53, as will be noted in Fig. 8, is provided with a nose portion projecting outwardly from said ear and having a surface 57 which engages in full contacting relation the upper surface of the adjacent transverse web 51. The stops 56 are adapted to coact with hooks 58 to assure arresting of the pivotal movement of the mold sections in their closed position. The hooks 58 are formed as integral parts of the mold sections, being formed as outwardly projecting elements from a web 51 and located midway between the spaced ears 53. The hooks are provided with upwardly directed ends 59, the inner surface of which is finished to engage the lower area of the wall surface of the web 51, between the spaced ears 54, simultaneously with engagement at the upper surface by the associated stops 56. As the mold sections are carried upwardly, the stops 56 and hooks 58 are moved out of engagement with their contacting surfaces of the webs 51 as shown in Fig. 8 wherein certain of the mold sections are located in substantially their uppermost limit of movement.

According to this invention and particularly as illustrated in Figs. 1, 4 and 6, the character of the pattern cut sheet 35 places the greatest length in unstable equilibrium or out-of-balance with the longitudinal axis thereof. This factor and the particular wedge shape of the end areas imposes a problem of balanced support as well as one of locating the glass sheet for proper registry with the shaping surface of the mold.

In order to properly carry the sheet at each end, the mold of this invention is provided on each of its end sections 12 and 13 with a V-shaped supporting wing 60 secured to and carried by a shaft 61. Each shaft 61 is journaled in uprights 62 (Fig. 6) which rise from and are formed integrally with the crotch member 44 of each of said sections 12 and 13. Each shaft 61, at one end, is provided with a crank portion 63 that is pivotally associated with one end of a link 64. Each link 64 has an arched portion 65, as will be noted in Figs. 5 and 7, so that said link will not strike or interfere with the hingedly connected mold sections during their vertically upward and downward movement. The opposite ends of the links are attached by pins 66 to lugs 67 formed on the central mold sections 11 closely adjacent the spaced ears 53 at the ends thereof.

The wings 60 are generally of a wedge-shaped outline in plan view, closely approximating the form of the wedge shaped crotch members 44 of the mold 10, and their leg sectors 68 are disposed in close proximity to the inner rails 49 of said end members. The leg sectors 68 are adapted to receive and support the ends of the glass sheet 35 above the mold 10 while the sheet is in a flat condition, and these legs are of such length that the ends or apices of the sheet will be carried on the upper surfaces 69 of the leg sectors in properly balanced registration with the mold.

In order to quickly and accurately locate the glass sheet by its ends, locator devices 70 are provided on the leg sectors 68 of the wings 60. These locators, in the form of Marinite blocks 71, or other suitable and like material, are carried in brackets 72 secured to the outer surfaces of the legs. The ends of the glass sheet are thus located in a wedge shaped enclosure formed by the locators 70 and upon the surfaces 69 of the legs 68 in such a positive manner that the inherent unstable equilibrium of its mass is compensated for.

The wings 60, in their pivotal relation to the mold 10 generally, are connected through the links 64 to the central sections 11 in such a manner as to be caused to swing upwardly as the mold is raised to its open position and the associated sections thereof are distended. More specifically stated, the ends of the links 64, pivotally connected to the lugs 67 on the mold section 11 by pins 66, are maintained or carried upward by said section in a substantially fixed, vertical order of motion and, consequently, the distention of the sections 12 and 13 of the mold will produce a swinging movement that will be imparted by the links 64 and through the cranks 63 to the shafts 61 of the wings 60.

The relative positions and operations of these co-acting members is illustrated in Fig. 5 wherein the mold 10, or one end thereof, is shown by phantom lines in its closed and open positions. Now, as the mold is raised from the closed position, as indicated by the letter d, and its end sections are swung upwardly and substantially outwardly, the central section 11 moves in a vertical direction while the outward swinging operation of the end sections is carried by the links 15. The integral lug 67 on the section 11 carries the adjoining end of the link 64 upwardly in a similar vertical manner but since the several parts of the end section are swinging with respect to one another on the axes of the hinge pins 55, the length of the chord line e, between the axis of the pin 66 and the axis of the shaft 61, will become materially longer when the end mold sections are in their open positions, as shown by the chord line f.

By means of the links 64 and the cranks 63, this lengthening action causes the links to rotate said cranks and the related shafts 61 and thereby the wings 60 from their out-of-contact positions indicated by the letter h, and into glass receiving and supporting positions at the opposite ends of the mold, as indicated by the letter i. These operative actions of the glass supporting wings 60 are thus actively controlled by the rise and fall of the mold and the progressive rotation of the shafts 61 is calculated to mechanically retain the leg sectors 68 of the wings 60 in a glass receiving and supporting relationship during substantially all of the time that the mold is open and generally until the sections thereof have substantially returned to their closed positions at the end of the bending operation.

In connection with the above statements, it is to be noted that the opening action of the mold is reflected in and largely carried by a corresponding outwardly directed swinging movement of the links 15 at each of the corners of the mold. The links 15, in the out-of-plumb positions to which they are swung, exert a substantial compressive force against the glass when it is located on the mold and consequently impose this force upon the glass while it, in opposition, is functioning as a rigid column to sustain the mold open and against the weight of the mold. When properly heated, the glass loses its rigid character and, in softening, sags onto the mold under the acting forces of the mold's weight and the inward thrust imparted to its ends as the mold sinks downwardly toward its closed position. Normally the natural balance of the glass sheet between its ends lends itself to a stable condition through which the sheet is carried into the proper registry of its marginal edges with the shaping surface, but, as in the present instance, as the glass softens, the unstable equilibrium therein is imminent until a major portion of the sheet is in contact. Thus, it is preferable that the ends of the sheet be positively supported against unbalance until the mold has closed so far that only the extreme ends are out of contact with the shaping surface.

Now, since the extent of swinging motion, through which the links 64 move, is controlled with reference to the cranks 63, by the central mold sections 11, the actual support, afforded by the leg sectors 68 of the wings 60, will be maintained while the arms are moving downwardly in progressive relation to the downward and inward movement of the mold end members 44. The ends of the sheet 35 will thus be sustained in an elevated position above the shaping surface 52 to balance the sheet generally, though at a constantly diminishing distance, until, during the final motion of the links 64, the surfaces 69 of the wings 60 are carried beneath the shaping surface 52 at the end of the bending operation.

In practice, the mold 10 is carried by the frame 14 through a bending furnace in a continuous order of movement and is loaded with glass near the entry end thereof. By manually pulling on each end section 44, the mold is raised and fully opened as the mold sections swing with respect to one another. Simultaneously, the wings 60 are raised to present the surfaces 69 of their leg sectors 68 above the shaping surface 52 and in substantially horizontal alignment with one another as will be noted in Fig. 3 of the drawings. The glass sheet 35 is now located between the ends of the mold and, more particularly, is placed on the surfaces 69 and in edge contact with the surfaces of the locators 70.

The mold is now under compressive stress since the weight thereof and the out-of-plumb condition of the links 15 naturally urges it inwardly toward its closed position while at the same time the rigid character of the glass is acting as a column to hold the same open. This characteristic of the glass is exerted through the locators 70 while the surfaces 69 of the wings 60 are acting to bring the sheet to and support it in a state of equilibrium.

As the glass softens under heat, its service as a rigid column is destroyed and the combined forces of the mold directively urge the central area toward the shaping surface 52 and particularly in the area of the sections 11. While proper contact is being established to register the marginal edges of the sheet, the end mold sections 12 and 13 are simultaneously moving inwardly to complete the contour of the shaping surface and, since the wings 60 are operatively maintained to support the ends of the sheet above said surface, this settling continues outwardly and until the end areas thereof are actually folded inwardly and upwardly as the end mold sections 12 and 13 close. Complete balanced registration is thus effected before the sinking or descending motion of the central mold section 11 with reference to the end sections 12 and 13 causes the links 64 to complete their control of the wings 60 so that the extreme ends of the glass are released from their support thereon and allowed to settle upon those portions of the shaping surface 52 in said end mold members.

As previously noted, the curved outlines of the side rails 17 of the frame 14 and the mold 10 are substantially the same so that, if desired, the mold and the bent glass sheet thereon may be passed through a tempering area in which blasts of cool air are directed against the upper and lower surfaces of the hot glass.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for bending glass sheets, a mold made up of a plurality of sections arranged in end to end relation and having shaping surfaces formed on upwardly directed faces thereof which conform to the margin of a glass sheet bent on said mold, means for hingedly connecting the adjacent ends of adjoining sections together for movement into an open position to receive an unbent glass sheet and into closed position for receiving a bent sheet, the axis of said hinge means being located in substantial alignment with said shaping surface, means for locating a glass sheet in bending relation to said mold and for supporting said sheet in proper registration to the shaping surfaces of the mold sections during bending until the marginal portions of the sheet are received on said shaping surface comprising a pair of wings having sheet supporting surfaces thereon and mounted at the ends of the mold for movement from one position in which said sheet supporting surfaces are above said mold and in substantial alignment with one another to a second position into which they tend to fall from said first position and in which they will deposit the ends of the sheet of glass when bent onto said shaping surfaces, and means for supporting said mold sections for movement into an open position relative to one another to receive an unbent sheet between said wings and in which position they will tend to fall into said closed position.

2. In apparatus for bending glass sheets, a mold made up of a plurality of sections hingedly connected together and having shaping surfaces thereon which conform to the margin of a glass sheet bent on said mold when said sections are in a closed position relative to one another, means for locating a flat glass sheet in bending relation to said mold and for supporting said sheet in proper registration to the shaping surfaces of the mold during bending until the marginal portions of the bent sheet are received on said shaping surfaces comprising a pair of wings having sheet supporting surfaces thereon and mounted at the ends of the mold for movement from one position in which said sheet supporting surfaces are above said mold and in substantial alignment with one another into a second position in which they will deposit the ends of the sheet of glass when bent onto said shaping surfaces, means for supporting said mold sections for movement into an open position relative to one another to receive an unbent sheet between said wings but from which position they will tend to fall by gravity into said closed position, and means actuated by the movement of said mold sections from open to closed position for moving said wings from said first mentioned position to said second position.

3. In apparatus for bending glass sheets, a mold made up of a plurality of sections including end sections and center sections hingedly connected together and having shaping surfaces thereon which conform to the margin of a glass sheet bent on said mold when said sections are in a closed position relative to one another, means for locating a flat glass sheet in bending relation to said mold and for supporting said sheet in proper registration to the shaping surfaces of the mold during bending and until the marginal portions of the bent sheet are received on said shaping surfaces comprising a pair of wings having sheet locators and sheet supporting surfaces thereon and mounted at the ends of the mold for movement from one position in which said sheet supporting surfaces are above said mold and in substantial alignment with one another into a second position in which they will deposit the bent sheet of glass onto the shaping surfaces of said end sections, means for supporting said mold sections for movement from said closed position into an open position relative to one another to receive an unbent sheet between said locators and back into said closed position as said sheet bends, and linkage means between at least one of said center sections and said wings for moving said wings from said first mentioned position to said second position in timed relation to the movement of said mold sections from said open to said closed position.

4. In apparatus for bending glass sheets, a mold made up of a plurality of sections including end sections and center sections hingedly connected together and having shaping surfaces thereon which conform to the margin of a glass sheet bent on said mold when said sections are in a closed position relative to one another, means for locating a flat glass sheet in bending relation to said mold and for supporting said sheet in proper registration to the shaping surfaces of the mold during bending and until the marginal portions of the bent sheet are received on said shaping surfaces comprising a pair of wings having sheet locators and sheet supporting surfaces thereon and mounted at the ends of the mold for movement from one position in which said sheet supporting surfaces are above said mold and in substantial alignment with one another into a second position in which they will deposit the bent sheet of glass onto the shaping surfaces of said end sections, a frame arranged in surrounding relation to said mold, link members for suspending said mold from said frame, means for pivotally connecting one end of said link members to said end sections, means for pivotally connecting the opposite end of said link members to said frame whereby to support said mold sections for movement from said closed position into an open position relative to one another to receive an unbent sheet between said locators and back into said closed position as said sheet bends, and linkage means between at least one of said center sections and said wings for moving said wings from said first mentioned position to said second position in timed relation to the movement of said mold sections from said open to said closed position.

5. In apparatus for bending glass sheets, a frame, a mold positioned within said frame and made up of a plurality of sections including center sections and end sections hingedly connected together and terminating in wedge-shaped end sections at opposite ends of said mold, shaping surfaces on said mold sections which conform to the margin of a glass sheet bent on said mold when said sections are in a closed position relative to one another, means for locating a flat glass sheet in bending relation to said mold and for supporting said sheet in proper registration to the shaping surfaces of the mold during bending and until the marginal portions of the bent sheet are received on said shaping surfaces comprising a pair of wings having sheet locators and sheet supporting surfaces thereon and mounted at the ends of the mold for movement from one position in which said sheet supporting surfaces are above said mold and in substantial alignment with one another into a second position in which they will deposit the bent sheet of glass onto the shaping surfaces of said end sections, link members for suspending said mold from said frame, means for pivotally connecting one end of said link members to said wedge-shaped end sections, means for pivotally connecting the opposite end of said link members to said frame whereby to support all of said mold sections for movement from said closed position into an open position relative to one another to receive an unbent sheet between said locators and back into said closed position as said sheet bends, and linkage means between at least one of said center sections and said wings for moving said wings from said first mentioned position to said second position in timed relation to the movement of said mold sections from said open to said closed position.

6. In apparatus for bending glass sheets, a frame, a mold positioned within said frame and made up of a plurality of sections including center sections and end sections hingedly connected together and terminating in wedge-shaped end sections at opposite ends of said mold, shaping surfaces on said mold sections which conform to the margin of a glass sheet bent on said mold when said sections are in a closed position relative to one another, means for locating a flat glass sheet in bending relation to said mold and for supporting said sheet in proper registration to the shaping surfaces of the mold during bending and until the marginal portions of the bent sheet are received on said shaping surfaces comprising a pair of V-shaped wings having sheet locators and sheet supporting surfaces thereon, shafts carrying said wings and rotatably mounted on said wedge shaped end sections to permit movement of said wings from one position in which said sheet supporting surfaces are above said mold and in substantial alignment with one another into a second position in which they will deposit the bent sheet of glass onto the shaping surfaces of said end sections, link members for suspending said mold from said frame, means for pivotally connecting one end of said link members to said wedge-shaped end sections, means for pivotally connecting the opposite end of said link members to said frame whereby to support said mold sections for movement from said closed position into an open position relative to one another to receive an unbent sheet between said locators and back into said closed position as said sheet bends, a crank portion on each of said shafts, and linkage means between at least one of said center sections and said cranks for moving said wings from said first mentioned position to said second position in timed relation to the movement of said mold sections from said open to said closed position.

7. In glass bending apparatus, a mold comprising a plurality of sections arranged in end to end relation and having a shaping surface formed on an upwardly directed face of each of said sections conforming to the shape of a portion of a glass sheet to be bent on said mold, and means for hingedly connecting the adjacent ends of adjoining sections together for movement to an open position for receiving an unbent glass sheet and into closed position for receiving a bent sheet and having their axis of movement substantially in line with the shaping surfaces.

8. In glass bending apparatus, a mold comprising a plurality of sections including a central section and end sections arranged in end to end relationship, at least portions of said end sections extending angularly with respect to said center section and forming therewith a substantially continuous outline mold of a shape substantially conforming to the complete marginal outline of a glass sheet to be bent, means for hingedly connecting said sections together for movement to an open position for receiving an unbent glass sheet and into closed position for receiving a bent sheet, and a shaping surface conforming to the curvature to which it is desired to bend a glass sheet on said mold formed on upwardly directed surfaces of said sections, said hinge means comprising cooperating hinge parts carried by adjacent sections for movement relative to one another about a horizontal axis which is located substantially in line with the shaping surface of the mold.

9. In apparatus for bending a glass sheet or the like to a predetermined curvature, a mold comprising a plurality of hingedly connected sections, means supporting said sections for movement from an open, spread apart position to a closed position which defines said predetermined curvature, means for supporting and locating said sheet in proper relation above said mold prior to the bending thereof, and means operatively connecting said supporting and locating means to said mold sections for causing said means to deposit said sheet onto said mold as it moves from the open to the closed position.

10. In apparatus for bending a glass sheet or the like, a mold comprising a plurality of hingedly connected sections having a shaping surface formed on the upper edge thereof which conforms in outline to the margins of the bent glass sheet, means supporting said sections for movement from an open to a closed position, sheet edge supporting and locating means mounted for movement from a position above the shaping surface of said mold sections to another position below said shaping surface, and means operatively connecting said supporting and locating means with said mold sections to cause said means to move from said upper to said lower position during movement of the mold sections from the open to the closed position.

11. In apparatus for bending a glass sheet or the like, a mold comprising a plurality of hingedly connected sections having a shaping surface formed on the upper edges thereof, means mounting said mold sections for movement from an open, spread apart position corresponding approximately to the length of said sheet prior to the bending thereof to a closed position which defines the curvature to which said sheet is to be bent, sheet edge locating and supporting means mounted for movement relative to said mold sections from a first position above said shaping surface for supporting said sheet prior to the bending thereof to a second position below said shaping surface for depositing said sheet onto said mold sections during the bending thereof, and means operatively connecting said locating and supporting means with said mold sections for causing said locating and supporting means to move from said first to said second position during movement of said mold sections from said open to said closed position.

References Cited in the file of this patent

UNITED STATES PATENTS

| | | |
|---|---|---|
| 1,999,558 | Black | Apr. 30, 1935 |
| 2,518,951 | Smith | Aug. 15, 1950 |